United States Patent
Kuji

(10) Patent No.: US 11,872,888 B2
(45) Date of Patent: Jan. 16, 2024

(54) DRIVE SYSTEM OF HYBRID UTILITY VEHICLE

(71) Applicant: KAWASAKI MOTORS, LTD., Akashi (JP)

(72) Inventor: Yasuhiro Kuji, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/805,413

(22) Filed: Jun. 3, 2022

(65) Prior Publication Data

US 2023/0391180 A1    Dec. 7, 2023

(51) Int. Cl.
*B60K 6/40* (2007.10)
*B60K 6/543* (2007.10)
*B60K 6/48* (2007.10)
*F16H 37/08* (2006.01)

(52) U.S. Cl.
CPC ............ *B60K 6/48* (2013.01); *B60K 6/40* (2013.01); *B60K 6/543* (2013.01); *B60K 2006/4825* (2013.01); *B60K 2006/4833* (2013.01); *B60Y 2200/20* (2013.01); *F16H 37/084* (2013.01)

(58) Field of Classification Search
CPC . B60K 6/40; B60K 6/48; B60K 6/543; B60K 2006/4825; B60K 2006/4833; B60K 2200/20; B60K 6/00–547
See application file for complete search history.

(56) References Cited

U.S. PATENT DOCUMENTS

| | | | | |
|---|---|---|---|---|
| 6,447,417 B2 * | 9/2002 | Kanehisa | ............ | B60W 20/40 903/905 |
| 7,637,836 B2 * | 12/2009 | Watanabe | ............ | B60W 10/08 475/5 |
| 7,690,338 B2 * | 4/2010 | Kawada | ............ | F02N 19/004 123/90.15 |
| 8,602,933 B2 * | 12/2013 | Kawasaki | ............ | B60K 6/543 475/5 |
| 9,458,909 B2 * | 10/2016 | Sugimoto | ............ | F16H 57/0473 |
| 9,527,375 B2 * | 12/2016 | Clark | ............ | B60K 6/387 |
| 9,545,842 B2 * | 1/2017 | Kawasaki | ............ | B60W 10/08 |
| 9,765,826 B2 * | 9/2017 | Nishimoto | ............ | F16D 21/04 |
| 10,744,868 B2 | 8/2020 | Borud et al. | | |
| 10,780,770 B2 | 9/2020 | Kohler et al. | | |
| 11,155,155 B2 * | 10/2021 | Cho | ............ | B60K 6/48 |
| 2021/0061097 A1 * | 3/2021 | Ozawa | ............ | F16H 37/065 |
| 2021/0138889 A1 * | 5/2021 | Köpfler | ............ | B60K 6/48 |
| 2021/0347243 A1 | 11/2021 | Kohler et al. | | |

FOREIGN PATENT DOCUMENTS

CN         111344181 A *  6/2020  ............ B60K 6/365

\* cited by examiner

*Primary Examiner* — Tinh Dang
(74) *Attorney, Agent, or Firm* — Alleman Hall Creasman & Tuttle LLP

(57) ABSTRACT

A drive system of a hybrid utility vehicle includes: an internal combustion engine including a crank shaft; a continuously variable transmission connected to the internal combustion engine; a drive train that connects an output shaft of the continuously variable transmission to a driving wheel; an electric motor; a branch train that connects the electric motor to the drive train such that power can be transmitted from the electric motor to the drive train; and an engine clutch that can cut transmission of rotational driving power, which has been input from the electric motor through the branch train to the drive train, to the internal combustion engine.

14 Claims, 10 Drawing Sheets

ENGINE TRAVELING MODE

MOTOR TRAVELING MODE

DRIVE SYSTEM OF HYBRID UTILITY VEHICLE

BACKGROUND OF THE INVENTION

Field of the Invention

The present disclosure relates to a drive system of a hybrid utility vehicle.

Description of the Related Art

U.S. Pat. No. 10,744,868 B2 discloses a hybrid utility vehicle which includes an internal combustion engine and an electric motor as driving power sources and can travel on an uneven ground. U.S. Pat. No. 10,744,868 B2 discloses: a series hybrid utility vehicle in which the electric motor is driven by using electric power generated by driving power of the internal combustion engine, and driving power of the electric motor is transmitted to wheels: and a parallel hybrid vehicle in which both the internal combustion engine and the electric motor can transmit the driving power to driving wheels. According to the parallel hybrid utility vehicle, a wide torque range is realized, and traveling performance on an uneven ground improves.

SUMMARY OF THE INVENTION

A drive system of a hybrid utility vehicle according to one aspect of the present disclosure includes: an internal combustion engine including a crank shaft; a continuously variable transmission including an input shaft connected to the internal combustion engine, an output shaft, a driving pulley disposed at the input shaft, a driven pulley disposed at the output shaft, and a belt wound around the driving pulley and the driven pulley; a drive train that connects the output shaft of the continuously variable transmission to a driving wheel; an electric motor; a branch train that connects the electric motor to the drive train such that power is transmitted from the electric motor to the drive train; and an engine clutch that cuts transmission of rotational driving power, which has been input from the electric motor through the branch train to the drive train, to the internal combustion engine.

DESCRIPTION OF THE PREFERRED EMBODIMENTS

Hereinafter, embodiments will be described with reference to the drawings.

Embodiment 1

Figure 1:
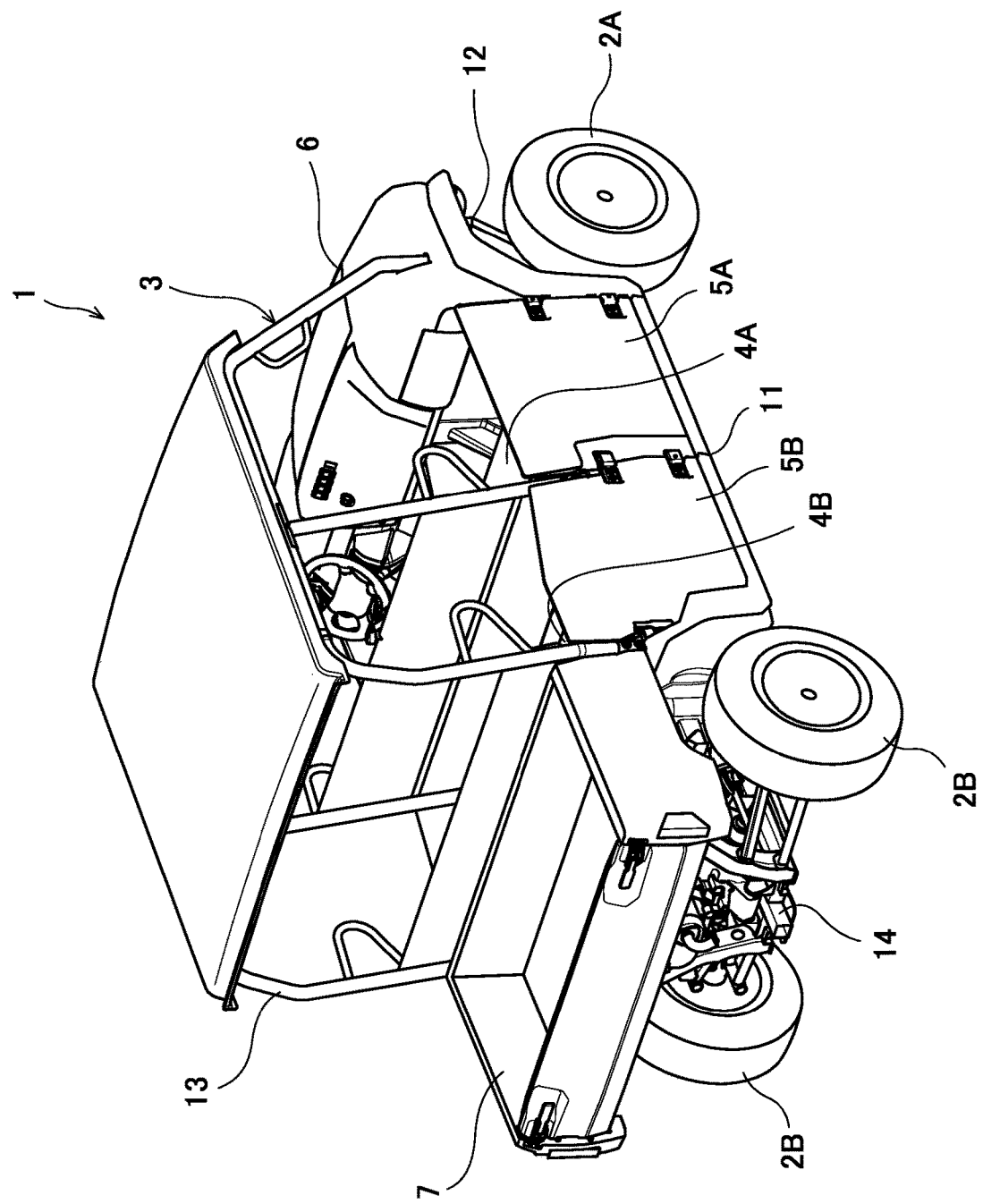
FIG. 1 is a perspective view of a hybrid utility vehicle according to Embodiment 1.

FIG. 1 is a perspective view of a hybrid utility vehicle 1 according to Embodiment 1. As shown in FIG. 1, the hybrid utility vehicle 1 includes a pair of left and right front wheels 2A and a pair of left and right rear wheels 2B. The front wheels 2A and the rear wheels 2B support a vehicle body frame 3. Balloon tires are used for the front wheels 2A and the rear wheels 2B. The vehicle body frame 3 is a pipe frame including pipes connected to each other.

The vehicle body frame 3 includes a base frame 11, a front frame 12, a cabin frame 13, and a rear frame 14. The base frame 11 supports a front row seat 4A and a rear row seat 4B. The front row seat 4A includes a driver's seat and a front passenger seat. A front row side door 5A is arranged at a lateral side of the front row seat 4A, and a rear row side door 5B is arranged at a lateral side of the rear row seat 4B. The number of rows of occupant seats does not have to be two and may be one. The front frame 12 extends forward from the base frame 11 and supports the front wheels 2A and the like. The front frame 12 supports a hood 6 arranged in front of the cabin frame 13. The hood 6 covers a space between the left and right front wheels 2A from above so as to be openable and closable.

The cabin frame 13 projects upward from the base frame 11 and is formed so as to surround an occupant space where the front row seat 4A and the rear row seat 4B are arranged. The occupant space surrounded by the cabin frame 13 is exposed to an outside. The rear frame 14 extends rearward from the base frame 11 and is arranged behind the cabin frame 13. A cargo bed 7 supported by the rear frame 14 is arranged behind the cabin frame 13. The cargo bed 7 is open upward. The cargo bed 7 may be configured to be tiltable by using a rear end portion of the cargo bed 7 as a fulcrum such that a front end portion of the cargo bed 7 moves upward.

Figure 2:
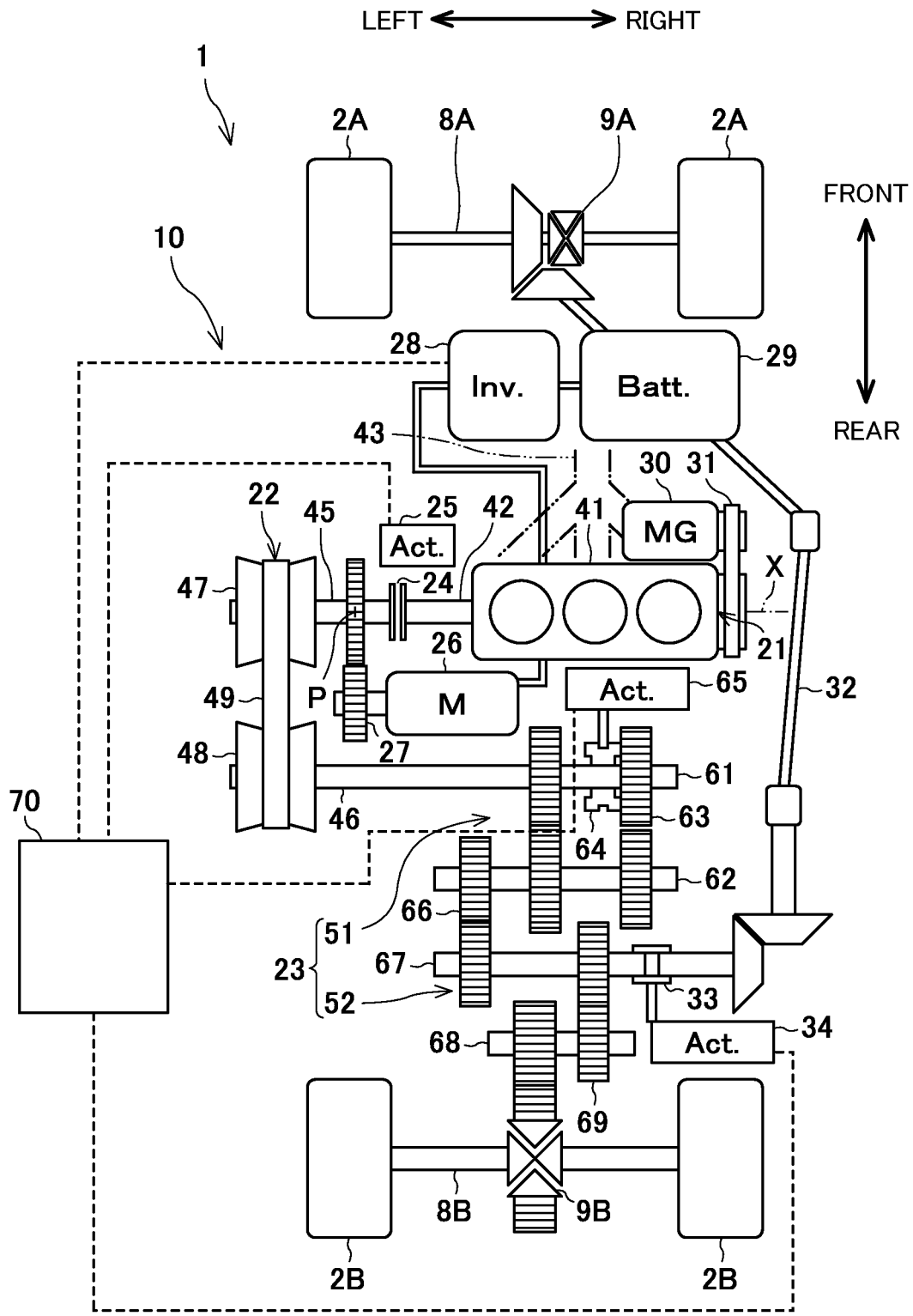
FIG. 2 is a plan view of a drive system of the hybrid utility vehicle of FIG. 1.

FIG. 2 is a plan view of a drive system 10 of the hybrid utility vehicle 1 of FIG. 1. As shown in FIG. 2, the drive system 10 includes an internal combustion engine 21, a continuously variable transmission 22, a drive train 23, an engine clutch 24, a clutch actuator 25, an electric motor 26, a branch train 27, an inverter 28, a battery 29, a motor generator 30, an MG train 31, a propeller shaft 32, a propeller shaft clutch 33, a clutch actuator 34, and a controller 70. A starter motor may be used instead of the motor generator 30.

The internal combustion engine 21 is a prime mover that may serve as a driving power source. The internal combustion engine 21 includes a cylinder 41 and a crank shaft 42. To be specific, according to the internal combustion engine 21, combustion energy of a combustion chamber of the cylinder 41 is converted into rotational power of the crank shaft 42, and the rotational power is output as driving power. An axis X of the crank shaft 42 extends in a vehicle width direction (left-right direction) of the vehicle 1. Both end portions of the crank shaft 42 project in the vehicle width direction from a crank case located under the cylinder 41. An exhaust pipe 43 is connected to an exhaust port of the cylinder 41. The exhaust pipe 43 is connected from one side of the internal combustion engine 21 in a front-rear direction of the vehicle 1. Specifically, the exhaust pipe 43 is connected to the internal combustion engine 21 from the front side. To be specific, the exhaust pipe 43 extends forward from the cylinder 41.

The continuously variable transmission 22 is arranged at one side of the internal combustion engine 21 in the vehicle width direction. The continuously variable transmission 22 includes an input shaft 45, an output shaft 46, a driving pulley 47, a driven pulley 48, and a belt 49. The input shaft 45 and the output shaft 46 extend in the vehicle width direction of the vehicle 1. The input shaft 45 of the continuously variable transmission 22 is arranged on the same axis as the crank shaft 42 of the internal combustion engine 21. The input shaft 45 is connected to the engine 21 through the engine clutch 24. The output shaft 46 is arranged behind the input shaft 45. The driving pulley 47 is disposed at the input shaft 45 so as to rotate integrally with the input shaft 45. The driven pulley 48 is disposed at the output shaft 46 so as to rotate integrally with the output shaft 46. The belt 49 is wound around the driving pulley 47 and the driven pulley 48.

The drive train 23 connects the output shaft 45 of the continuously variable transmission 22 to a rear differential device 9B, which is connected to the rear wheels 2B, such that the rotational power output from the continuously variable transmission 22 can be transmitted to the rear wheels 2B. The drive train 23 includes a gear transmission 51 and a final gear mechanism 52.

The gear transmission 51 includes an input shaft 61, an output shaft 62, a transmission gear train 63, a dog clutch 64, and a transmission actuator 65. The input shaft 61 and the output shaft 62 extend in the vehicle width direction of the vehicle 1. The input shaft 61 of the gear transmission 51 is arranged on the same axis as the output shaft 46 of the continuously variable transmission 22. The input shaft 61 of the gear transmission 51 is directly coupled to the output shaft 46 of the continuously variable transmission 22. The output shaft 62 is arranged behind the input shaft 61.

The transmission gear train 63 includes transmission gear pairs that change the speed of the rotational power of the input shaft 61 and transmit the rotational power to the output shaft 62. The number of transmission gear pairs of the transmission gear train 63 corresponds to the number of gear stages. The number of gear stages of the gear transmission 51 of the present embodiment is two (a first speed and a second speed) but may be three or more. The transmission gear train 63 includes a neutral stage. The dog clutch 64 is driven by the transmission actuator 65 to be selectively engaged with the transmission gear pair to which the power is transmitted among the transmission gear pairs of the transmission gear train 63. When the dog clutch 64 driven by the transmission actuator 65 is located at such a position as not to be engaged with the transmission gear train 63, the gear transmission 51 becomes a neutral state in which the transmission gear train 63 does not transmit the power. The transmission actuator 65 may be, for example, an electric actuator or a hydraulic actuator. The dog clutch 64 may be manually operated without using the transmission actuator.

The final gear mechanism 52 is connected to the output shaft 62 of the gear transmission 51 through a gear pair 66. The final gear mechanism 52 transmits the rotational power, output from the gear transmission 51, to the rear differential device 9B at a predetermined reduction ratio. The final gear mechanism 52 includes: shafts 67 and 68 parallel to the output shaft 62 of the gear transmission 51; and a gear pair 69 disposed at the shafts 67 and 68. The final gear mechanism 52 connects the output shaft 62 of the gear transmission 51 to the rear differential device 9B.

The engine clutch 24 allows or cuts power transmission between the crank shaft 42 of the internal combustion engine 21 and the input shaft 45 of the continuously variable transmission 22. The engine clutch 24 is, for example, a friction clutch. The clutch actuator 25 drives the engine clutch 24 to switch the engine clutch 24 between an engaged state and a disengaged state. The clutch actuator 25 may be, for example, an electric actuator or a hydraulic actuator.

The electric motor 26 is a prime mover that may serve as a driving power source. A driving shaft of the electric motor 26 extends along the axis X of the crank shaft 42. The driving shaft of the electric motor 26 extends parallel to the crank shaft 42 of the internal combustion engine 21. The electric motor 26 is connected to the input shaft 45 of the continuously variable transmission 22 through the branch train 27. The branch train 27 is connected to the input shaft 45 of the continuously variable transmission 22 so as to join a predetermined joining point P of a power transmission path between the internal combustion engine 21 and the continuously variable transmission 22. Specifically, the joining point P is set on the input shaft 45. The rotational power transmitted from the electric motor 26 through the branch train 27 to the input shaft 45 is transmitted through the drive train 23 to the drive train 23. The branch train 27 is, for example, a gear mechanism but may be a pulley-belt mechanism or a chain-sprocket mechanism.

The engine clutch 24 is interposed between the joining point P and the internal combustion engine 21 on the power transmission path between the internal combustion engine 21 and the continuously variable transmission 22. Therefore, the engine clutch 24 can cut the transmission of the rotational power, which has been input from the electric motor 26 through the branch train 27 to the continuously variable transmission 22 and the drive train 23, to the internal combustion engine 21.

The electric motor 26 is arranged at the other side of the internal combustion engine 21 in the front-rear direction of the vehicle 1. The electric motor 26 is closer to an intake port of the internal combustion engine 21 than to the exhaust port of the internal combustion engine 21. Specifically, the electric motor 26 is arranged behind the internal combustion engine 21. At least a part of the electric motor 26 is arranged within a region between one vehicle width direction end of the internal combustion engine 21 and the other vehicle width direction end thereof in the vehicle width direction of the vehicle. At least a part of the electric motor 26 overlaps the internal combustion engine 21 when viewed in the front-rear direction of the vehicle 1. For example, at least a part of the electric motor 26 is arranged right behind the cylinder 41 of the internal combustion engine 21. At least a part of the electric motor 26 is arranged at a vehicle width direction inner side of both vehicle width direction ends of the cylinder 41 and at an upper-lower direction inner side of both upper-lower direction ends of the cylinder 41.

At least a part of the electric motor 26 may be arranged in a region between one vehicle width direction end of the internal combustion engine 21 and the other vehicle width direction end thereof in the vehicle width direction of the vehicle 1 in a state where the electric motor 26 does not overlap the internal combustion engine 21 when viewed in the front-rear direction of the vehicle 1. To be specific, at least a part of the electric motor 26 may be arranged in a region between one vehicle width direction end of the internal combustion engine 21 and the other vehicle width direction end thereof in the vehicle width direction of the vehicle 1 in a state where the electric motor 26 deviates from the internal combustion engine 21 in the upper-lower direction.

The inverter 28 is electrically connected to the electric motor 26. The battery 29 is electrically connected to the inverter 28. The inverter 28 is incorporated in the electric motor 26. The motor generator 30 is connected to the crank shaft 42 of the internal combustion engine 21 through the MG train 31 such that the power can be transmitted from the motor generator 30 to the crank shaft 42. The MG train 31 is, for example, a pulley-belt mechanism but may be a gear mechanism or a chain-sprocket mechanism.

The motor generator 30 is arranged in front of the internal combustion engine 21. To be specific, the internal combustion engine 21 is arranged between the electric motor 26 and the motor generator 30 in the front-rear direction of the vehicle 1. The MG train 31 is connected to one end portion of the crank shaft 42 which is opposite to the other end portion connected to the continuously variable transmission 22. The branch train 27 is arranged at a first side (for example, a left side) of the internal combustion engine 21 in an axial direction of the crank shaft 42, and the MG train 31 is arranged at a second side (for example, a right side) of the internal combustion engine 21 in the axial direction of the crank shaft 42.

The propeller shaft 32 connects the drive train 23 to a front differential device 9A, connected to the front wheels 2A, such that the rotational power output from the continuously variable transmission 22 can be transmitted to the front wheels 2A. Specifically, the propeller shaft 32 is connected to the shaft of the final gear mechanism 52 through a gear pair. In FIG. 2, for convenience of the drawing, the propeller shaft 32 passes through a lateral side of the internal combustion engine 21 and is bent. However, the propeller shaft 32 actually passes through a lower side of the internal combustion engine 21.

The propeller shaft clutch 33 is interposed on a power transmission path between the shaft 67 of the final gear mechanism 52 and the propeller shaft 32. Therefore, the propeller shaft clutch 33 can cut the input from the continuously variable transmission 22 through the final gear mechanism 52 to the propeller shaft 32. The clutch actuator 34 drives the propeller shaft clutch 33 to switch the propeller shaft clutch 33 between an engaged state and a disengaged state. The clutch actuator 34 may be, for example, an electric actuator or a hydraulic actuator. When the propeller shaft clutch 33 is in the engaged state, the rotational power transmitted from the internal combustion engine 21 and the electric motor 26 through the continuously variable transmission 22 and the drive train 23 is transmitted to the propeller shaft 32, and therefore, the front wheels 2A are driven. When the propeller shaft clutch 33 is in the disengaged state, the rotational power transmitted from the internal combustion engine 21 and the electric motor 26 through the continuously variable transmission 22 and the drive train 23 is not transmitted to the propeller shaft 32, and therefore, the front wheels 2A are not driven.

The controller 70 controls the internal combustion engine 21, the inverter 28, the engine clutch 24, the transmission actuator 65, and the clutch actuator 34 to switch an operation mode (for example, an engine traveling mode, a motor traveling mode, and an electric power generating mode) of the drive system 10. The control by the controller 70 is performed based on a detection signal of at least one sensor mounted on the vehicle 1. The at least one sensor detects at least one of an accelerator operation amount of a driver, a brake operation amount of the driver, a mode switching command of the driver, a rotational frequency of the internal combustion engine 21, a rotational frequency of the electric motor 26, a traveling speed of the vehicle 1, an existence position of the vehicle 1, a fuel remaining amount, and a battery remaining amount.

The controller 70 includes a processor and a memory. The processor may include processors. Specifically, the controller 70 includes a CPU, a system memory, a storage memory, and the like. The CPU is a central processing unit. The system memory is, for example, a RAM. The storage memory is one example of a computer-readable medium and is a non-transitory physical medium. The storage memory may include a ROM. The storage memory may include a hard disk, a flash memory, or a combination thereof. The storage memory stores a program. A configuration in which the CPU executes the program read by the system memory is one example of a processing circuit. A part of the program or the entire program may be executed by a processor of a server connected to the controller 70 through a network.

Figure 3:
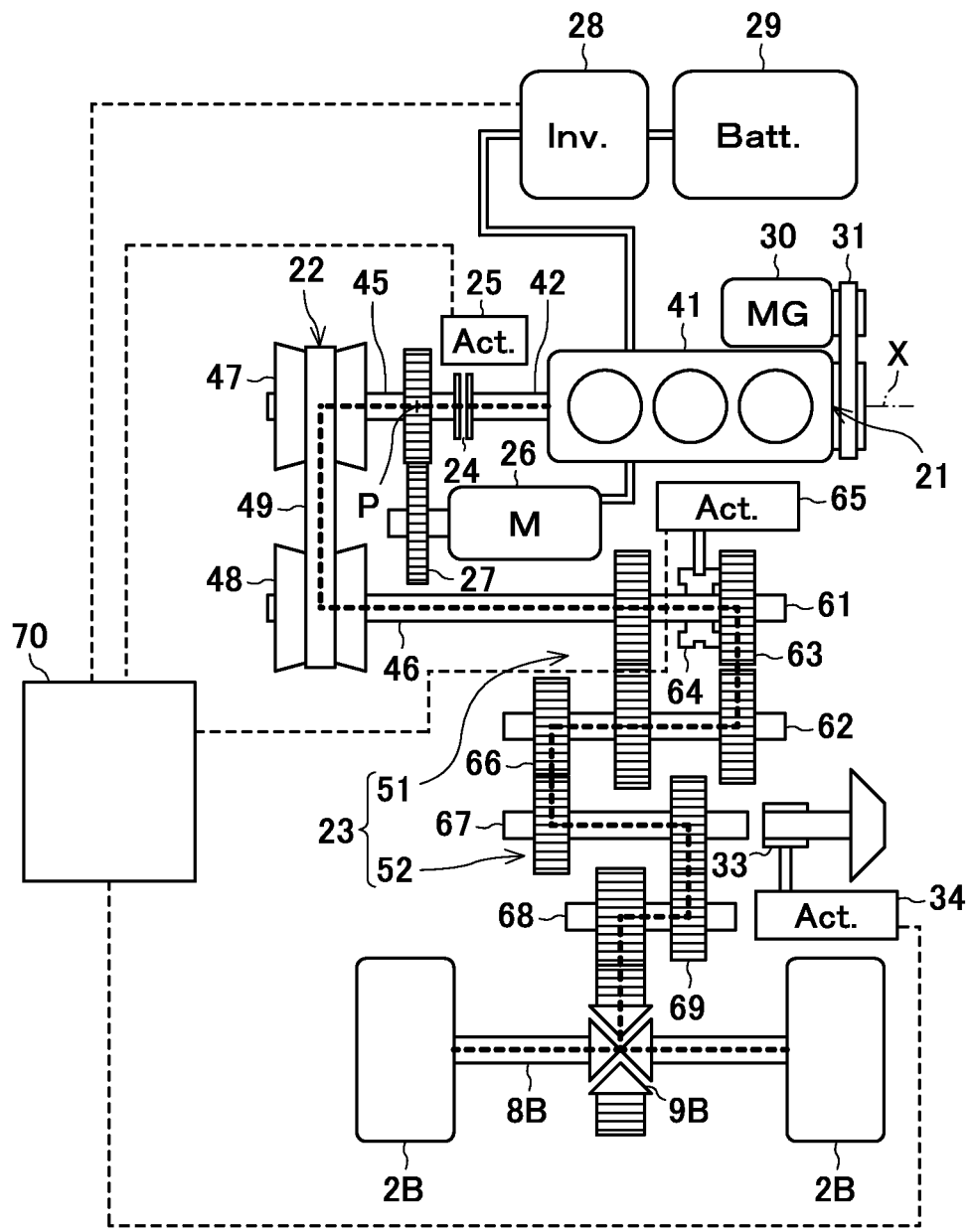
FIG. 3 is a plan view showing an engine traveling mode of the drive system of FIG. 2.

FIG. 3 is a plan view showing the engine traveling mode of the drive system 10 of FIG. 2. As shown in FIG. 3, when the request of the engine traveling mode is detected based on the detection signal of the at least one sensor mounted on the vehicle 1, the controller 70 starts the internal combustion engine 21. The controller 70 controls the clutch actuator 25 to set the engine clutch 24 to the engaged state. The controller 70 controls the inverter 28 to make the electric motor 26 generate electric power or to idle the electric motor 26. The controller 70 controls the transmission actuator 65 to set the gear transmission 51 to a desired gear stage. When the request of four-wheel drive is detected, the controller 70 controls the clutch actuator 34 to set the propeller shaft clutch 33 to the engaged state. When the request of two-wheel drive is detected, the controller 70 controls the clutch actuator 34 to set the propeller shaft clutch 33 to the disengaged state. When the request of the four-wheel drive is detected, the controller 70 controls the clutch actuator 34 to set the propeller shaft clutch 33 to the engaged state.

Figure 4:
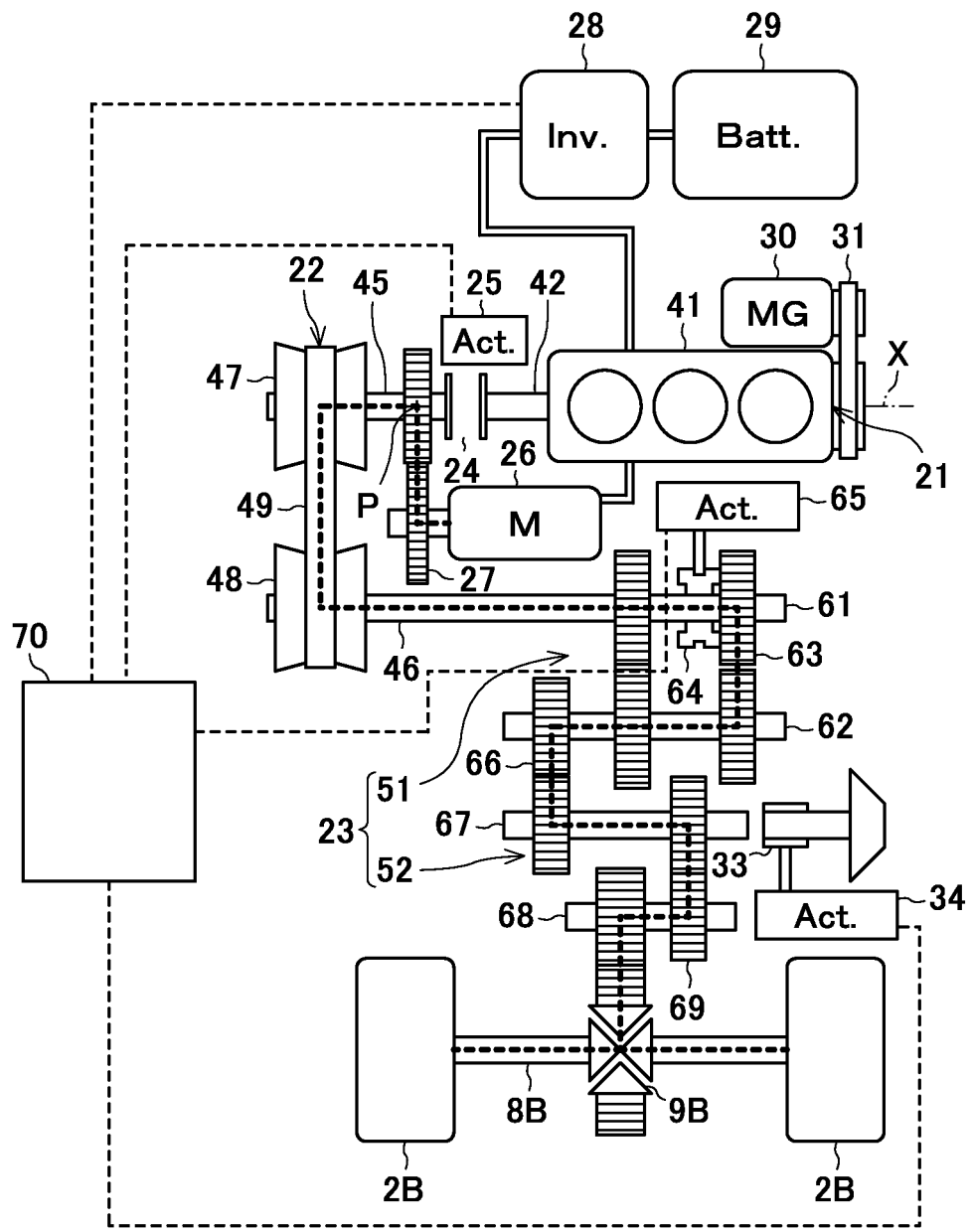
FIG. 4 is a plan view showing a motor traveling mode of the drive system of FIG. 2.

FIG. 4 is a plan view showing the motor traveling mode of the drive system 10 of FIG. 2. As shown in FIG. 4, when the request of the motor traveling mode is detected based on the detection signal of the at least one sensor mounted on the vehicle 1, the controller 70 controls the clutch actuator 25 to set the engine clutch 24 to the disengaged state. The controller 70 controls the inverter 28 to drive the electric motor 26. The controller 70 stops the internal combustion engine 21 or starts the internal combustion engine 21 to make the motor generator 30 generate electric power. The controller 70 controls the transmission actuator 65 to set the gear transmission 51 to a desired gear stage. When the request of the four-wheel drive is detected, the controller 70 controls the clutch actuator 34 to set the propeller shaft clutch 33 to the engaged state. When the request of the two-wheel drive is detected, the controller 70 controls the clutch actuator 34 to set the propeller shaft clutch 33 to the disengaged state. When the request of the four-wheel drive is detected, the controller 70 controls the clutch actuator 34 to set the propeller shaft clutch 33 to the engaged state.

Figure 5:
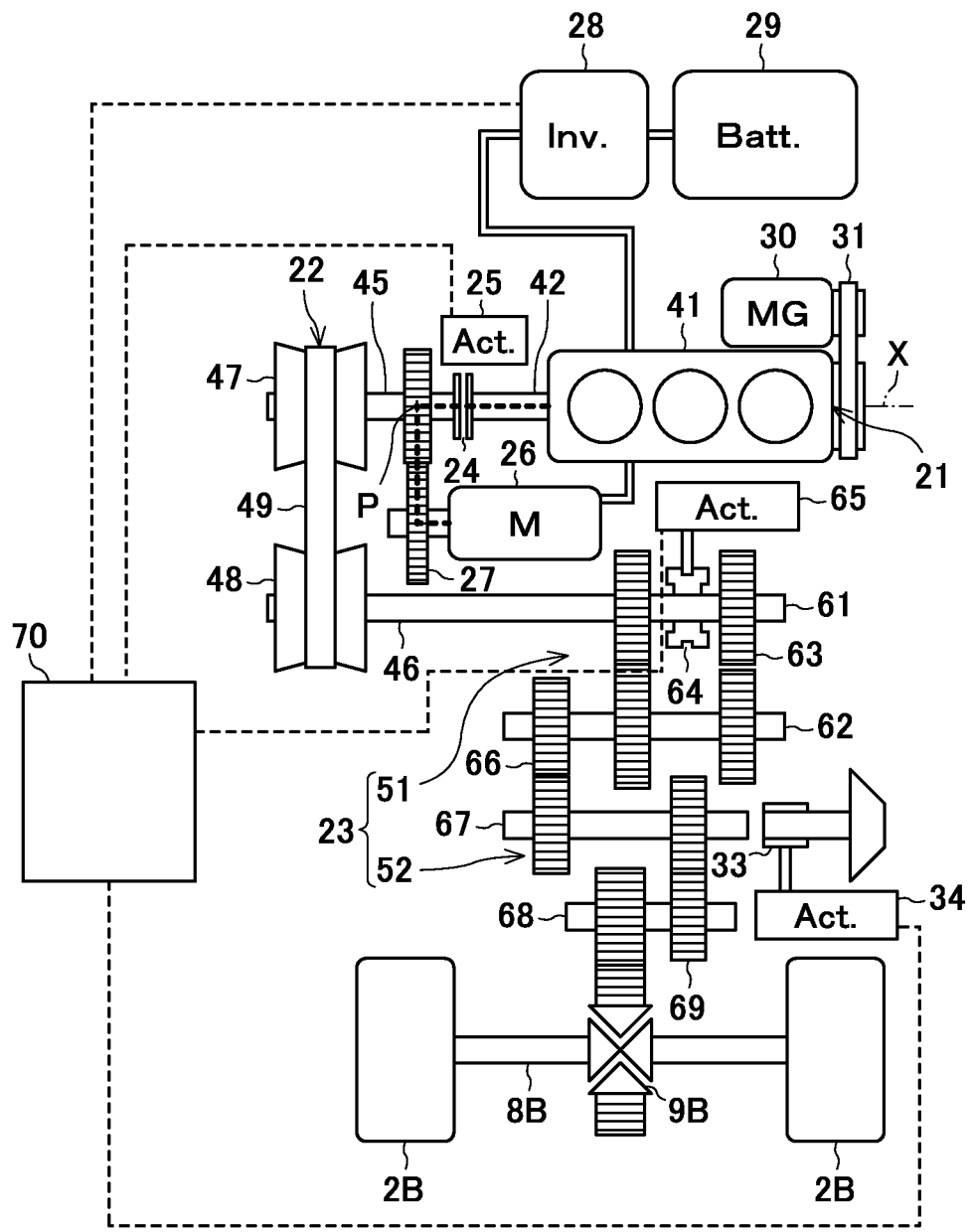
FIG. 5 is a plan view showing an electric power generating mode of the drive system of FIG. 2.

FIG. 5 is a plan view showing the electric power generating mode of the drive system 10 of FIG. 2. As shown in FIG. 5, when the request of the electric power generating mode is detected based on the detection signal of the at least one sensor mounted on the vehicle 1, the controller 70 controls the transmission actuator 65 to set the gear transmission 51 to the neutral state. The controller 70 starts the internal combustion engine 21. The controller 70 controls the clutch actuator 25 to set the engine clutch 24 to the engaged state. The controller 70 controls the inverter 28 to make the electric motor 26 generate electric power by the driving power of the internal combustion engine 21. Since the gear transmission 51 is in the neutral state during the electric power generation, the driving power of the internal combustion engine 21 is not transmitted to the rear wheels 2B. While the internal combustion engine 21 is operating, the motor generator 30 is also generating electric power.

According to the above-described configuration, when driving the rear wheels 2B by the driving power of the electric motor 26 with the internal combustion engine 21 in a stop state, the engine clutch 24 is set to the disengaged state. With this, the driving power of the electric motor 26 is not transmitted to the internal combustion engine 21, and therefore, the energy loss can be reduced.

A timing at which the power transmission between the electric motor 26 and the internal combustion engine 21 is cut can be freely determined by controlling the clutch actuator 25. Thus, various traveling modes can be realized.

The engine clutch 24 is interposed on a power transmission path between the joining point P and the internal combustion engine 21, and the driving power of the electric motor 26 is transmitted through the continuously variable transmission 22 to the rear wheels 2B. Therefore, a vehicle speed range during traveling that utilizes the driving power of the electric motor 26 can be widened.

When the gear transmission 51 is in the neutral state, and the engine clutch 24 is in the engaged state, the electric motor 26 as an electric power generator is driven by the internal combustion engine 21. With this, the electric power generation can be performed while the vehicle 1 is in a stop state.

Since the electric motor 26 is arranged at an opposite side of the exhaust pipe 43 across the internal combustion engine 21, the electric motor 26 hardly receives the heat of the exhaust pipe 43, and therefore, the temperature increase of the electric motor 26 can be suppressed.

The electric motor 26 overlaps the internal combustion engine 21 when viewed in the front-rear direction of the vehicle 1. Thus, an occupied space of the drive system 10 in the vehicle 1 can be made compact.

Since the motor generator 30 is used, it is unnecessary to arrange both a starter motor and a generator. Since the internal combustion engine 21 is arranged between the electric motor 26 and the motor generator 30, the electric motor 26 and the motor generator 30 are separately arranged at both sides of the internal combustion engine 21. Thus, layout efficiency improves.

The branch train 27 for the electric motor 26 and the MG train 31 for the motor generator 30 are separately arranged at both sides of the crank shaft 422 in the axial direction. Therefore, the layout efficiency improves.

Embodiment 2

Figure 6:
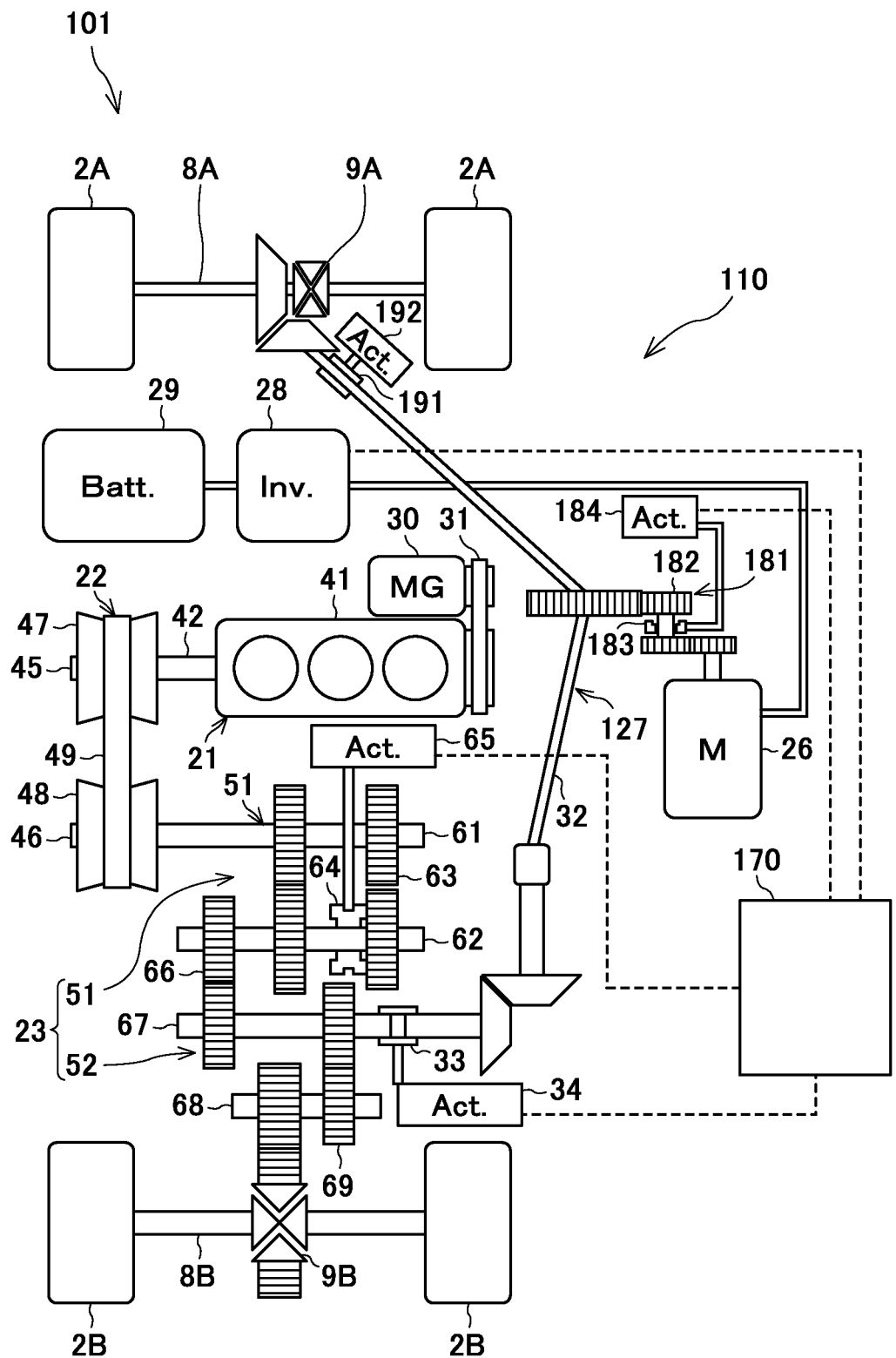
FIG. 6 is a plan view of the drive system of the hybrid utility vehicle according to Embodiment 2.

FIG. 6 is a plan view of a drive system 110 of a hybrid utility vehicle 101 according to Embodiment 2. The same reference signs are used for the same components as in Embodiment 1, and explanations thereof are omitted. As shown in FIG. 6, the crank shaft 42 of the internal combustion engine 21 is coupled to the input shaft 45 of the continuously variable transmission 22. A clutch (for example, a centrifugal clutch) may be interposed between the crank shaft 42 and the input shaft 45. The electric motor 26 is connected to an intermediate portion of the propeller shaft 32 through a gear assembly 181. The electric motor 26 and the gear assembly 181 are arranged at a middle portion of the vehicle 1 in the front-rear direction.

The electric motor 26 may overlap the internal combustion engine 21 when viewed in the front-rear direction of the vehicle 101. In this case, the propeller shaft 32 may pass through a lower side of the internal combustion engine 21 in the front-rear direction.

The gear assembly 181 transmits the rotational power of the driving shaft of the electric motor 26 to the propeller shaft 32. The gear assembly 181 includes a motor clutch 183 that can cut a power transmission path extending from the electric motor 26 to the propeller shaft 32. The motor clutch 183 is, for example, a dog clutch. The motor clutch 183 is driven by a clutch actuator 184. The clutch actuator 184 may be, for example, an electric actuator or a hydraulic actuator. The motor clutch 184 may be manually operated without using the clutch actuator 184. The gear assembly 181 and the propeller shaft 32 constitute a branch train 127 that connects the electric motor 26 to the drive train 23 such that the power can be transmitted from the electric motor 26 to the drive train 23.

A clutch 191 is interposed on a power transmission path between the propeller shaft 32 and the front differential device 9A. Therefore, the clutch 191 can cut the input of the rotational power of the propeller shaft 32 to the front differential device 9A. A clutch actuator 192 drives the clutch 191 to switch the clutch 191 between an engaged state and a disengaged state. The clutch actuator 192 may be, for example, an electric actuator or a hydraulic actuator.

As with the controller 70 of Embodiment 1, a controller 170 includes a processor and a memory. The controller 170 controls the internal combustion engine 21, the inverter 28, the transmission actuator 65, the clutch actuator 34, the clutch actuator 184, and the clutch actuator 192 to switch the operation mode (for example, the engine traveling mode, the motor traveling mode, and the engine-motor traveling mode) of the drive system 110. The control by the controller 170 is performed based on the detection signal of at least one sensor mounted on the vehicle 101. The at least one sensor detects at least one of the accelerator operation amount of the driver, the brake operation amount of the driver, the mode switching command of the driver, the rotational frequency of the internal combustion engine 21, the rotational frequency of the electric motor 26, the traveling speed of the vehicle 101, the existence position of the vehicle 1, the fuel remaining amount, and the battery remaining amount.

Figure 7:
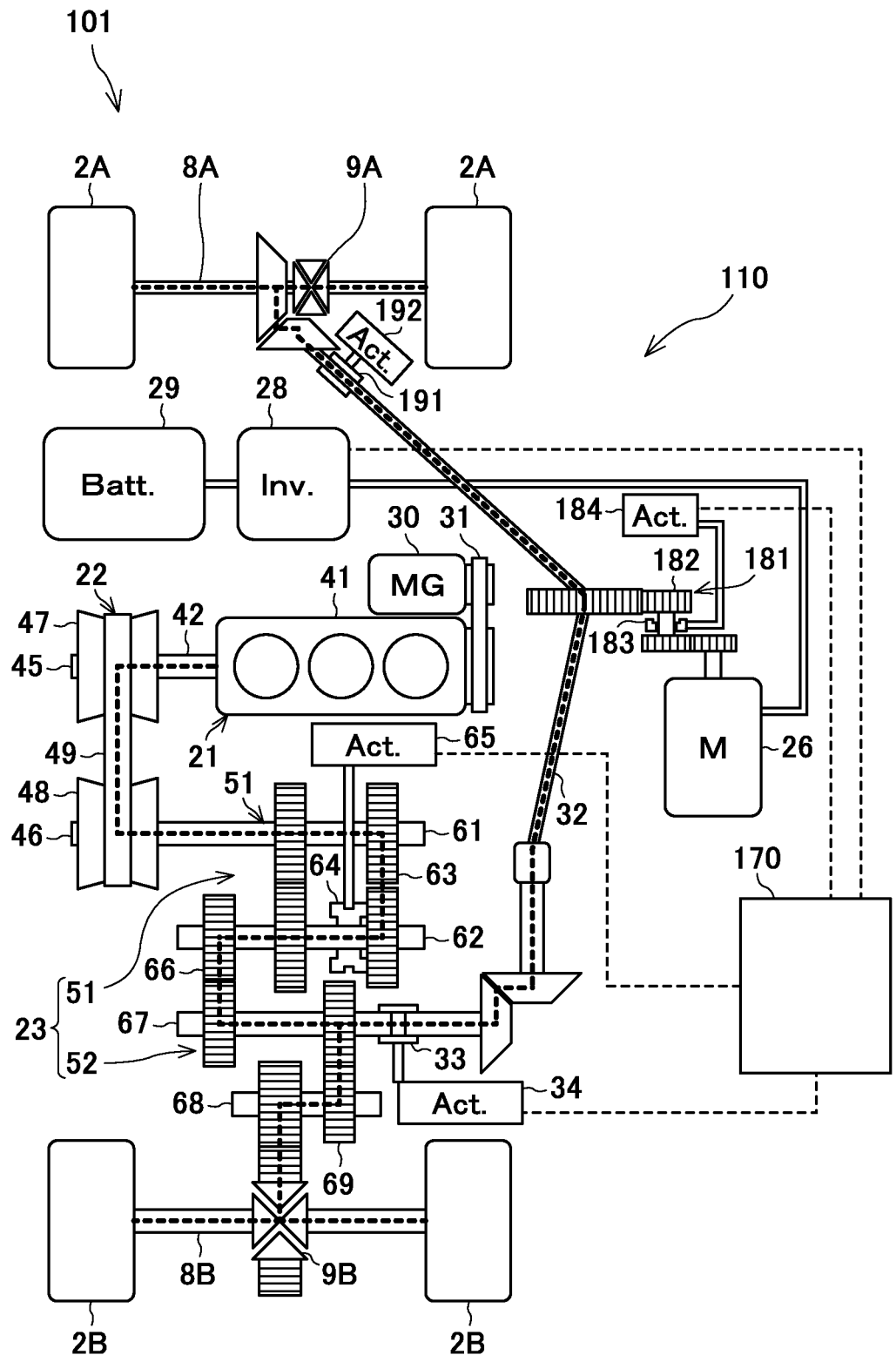
FIG. 7 is a plan view showing the engine traveling mode of the drive system of FIG. 6.

FIG. 7 is a plan view showing the engine traveling mode of the drive system 110 of FIG. 6. As shown in FIG. 7, when the request of the engine traveling mode is detected based on the detection signal of the at least one sensor mounted on the vehicle 101, the controller 170 stops the electric motor 26 and starts the internal combustion engine 21. The controller 170 controls the clutch actuator 184 to set the motor clutch 183 to the disengaged state. With this, the power transmission path between the propeller shaft 32 and the electric motor 26 is cut. When the request of the four-wheel drive is detected, the controller 170 controls the clutch actuator 34 to set the propeller shaft clutch 33 to the engaged state and controls the clutch actuator 192 to set the clutch 191 to the engaged state. When the request of the two-wheel drive is detected, the controller 170 controls the clutch actuator 34 to set the propeller shaft clutch 33 to the disengaged state. The controller 170 controls the transmission actuator 65 to set the gear transmission 51 to a desired gear stage.

Figure 8:
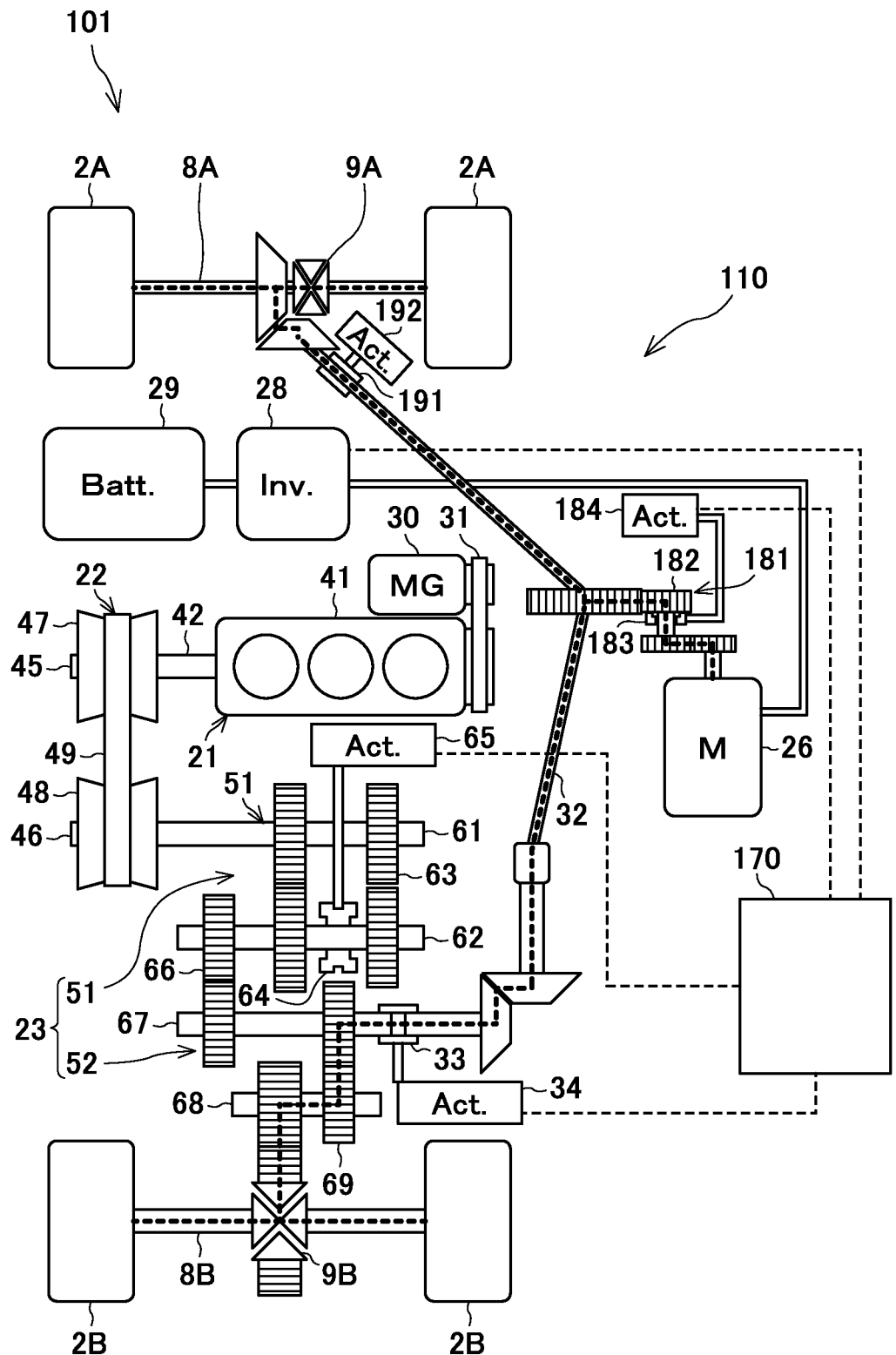
FIG. 8 is a plan view showing the motor traveling mode (4WD) of the drive system of FIG. 6.

FIG. 8 is a plan view showing the motor traveling mode (4WD) of the drive system 110 of FIG. 6. As shown in FIG. 8, when the request of the motor traveling mode is detected based on the detection signal of the at least one sensor mounted on the vehicle 101, the controller 170 stops the internal combustion engine 21, drives the electric motor 26, and controls the clutch actuator 184 to set the motor clutch 183 to the engaged state. When the request of the four-wheel drive is detected, the controller 170 controls the clutch actuator 34 to set the propeller shaft clutch 33 to the engaged state and controls the clutch actuator 192 to set the clutch 191 to the engaged state. The controller 170 controls the transmission actuator 65 to set the gear transmission 51 to the neutral state.

Figure 9:
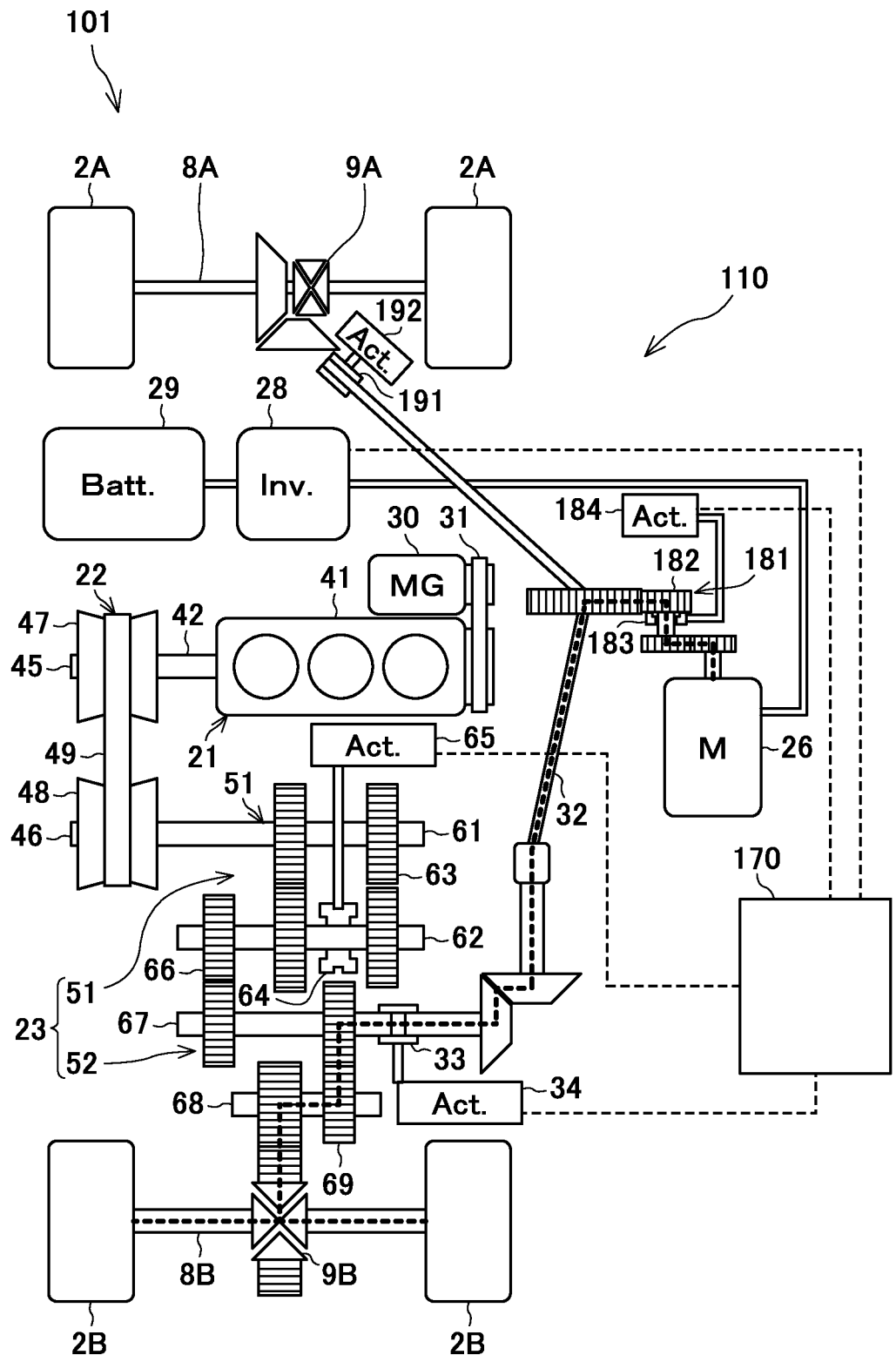
FIG. 9 is a plan view showing the motor traveling mode (2WD) of the drive system of FIG. 6.

FIG. 9 is a plan view showing the motor traveling mode (2WD) of the drive system 110 of FIG. 6. As shown in FIG. 9, when the request of the two-wheel drive (rear wheel drive) of the motor traveling mode is detected, the controller 170 controls the clutch actuator 34 to set the propeller shaft clutch 33 to the engaged state and controls the clutch actuator 192 to set the clutch 191 to the disengaged state. When the request of the two-wheel drive (front wheel drive) is detected, the controller 170 controls the clutch actuator 192 to set the clutch 191 to the engaged state and controls the clutch actuator 34 to set the propeller shaft clutch 33 to the disengaged state. The controller 170 controls the transmission actuator 65 to set the gear transmission 51 to the neutral state.

Figure 10:
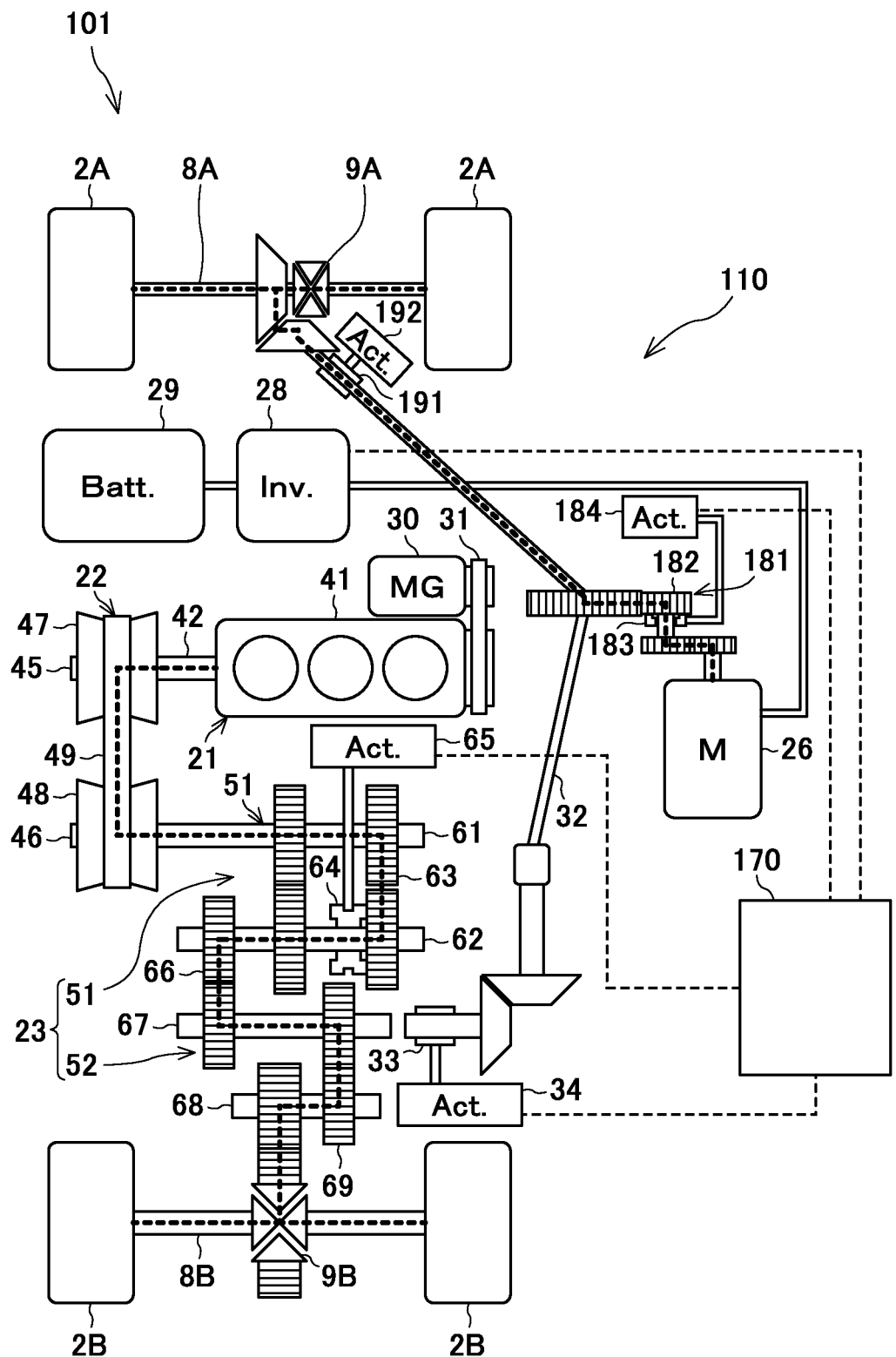
FIG. 10 is a plan view showing an engine-motor traveling mode (4WD) of the drive system of FIG. 6.

FIG. 10 is a plan view showing the engine-motor traveling mode (4WD) of the drive system 110 of FIG. 6. As shown in FIG. 10, when the request of the engine-motor traveling mode (4WD) is detected based on the detection signal of the at least one sensor mounted on the vehicle 101, the controller 170 starts the internal combustion engine 21 and the electric motor 26. The controller 170 controls the clutch actuator 34 to set the propeller shaft clutch 33 to the disengaged state and controls the clutch actuator 184 and the clutch actuator 192 to set the motor clutch 183 and the clutch 191 to the engaged state. With this, the internal combustion engine 21 drives the rear wheels 2B without driving the front wheels 2A, and the electric motor 26 drives the front wheels 2A without driving the rear wheels 2B.

According to the above-described configuration, when the driving power of the internal combustion engine 21 is transmitted through the drive train 23 and the propeller shaft 32 to the front wheels 2A, the motor clutch 183 of the gear assembly 181 becomes the disengaged state. With this, the rotation of the propeller shaft 32 can be prevented from being transmitted to the electric motor 26. Moreover, when the motor clutch 183 of the gear assembly 181 becomes the engaged state, the driving power of the electric motor 26 can be transmitted through the propeller shaft 32 to at least one of the front wheels 2A and the rear wheels 2B.

Various traveling modes can be realized by the control of the clutch actuators 34, 184, and 192. When driving the rear wheels 2B by the driving power of the electric motor 26 with the internal combustion engine 21 in a stop state, the gear transmission 51 is set to the neutral state. With this, the driving power of the electric motor 26 is not transmitted to the internal combustion engine 21 and the continuously variable transmission 22, and therefore, the energy loss can be reduced.

As above, the above embodiments have been described as examples of the technology disclosed in the present application. However, the technology in the present disclosure is not limited to these and is also applicable to embodiments in which modifications, replacements, additions, omissions, and the like are suitably made. Moreover, a new embodiment may be prepared by combining the components described in the above embodiments. For example, some components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A drive system of a hybrid utility vehicle, the drive system comprising:
    an internal combustion engine including a crank shaft;
    a continuously variable transmission including
        an input shaft connected to the internal combustion engine,
        an output shaft,
        a driving pulley disposed at the input shaft,
        a driven pulley disposed at the output shaft, and
        a belt wound around the driving pulley and the driven pulley;
    a drive train that connects the output shaft of the continuously variable transmission to a driving wheel;
    an electric motor;
    a branch train that connects the electric motor to the drive train such that power is transmitted from the electric motor to the drive train;
    an engine clutch that cuts transmission of rotational driving power, which has been input from the electric motor through the branch train to the drive train, to the internal combustion engine;
    a motor generator; and
    an MG train that connects the motor generator to the internal combustion engine such that power is transmitted between the motor generator and the internal combustion engine, wherein
    the internal combustion engine is arranged between the electric motor and the motor generator relative to a front-rear direction of the vehicle.

2. The drive system according to claim 1, further comprising:
    a clutch actuator that switches the engine clutch between a disengaged state and an engaged state; and
    a controller that controls the clutch actuator.

3. The drive system according to claim 1, wherein:
    the branch train is connected to the input shaft of the continuously variable transmission so as to join a predetermined joining point of a power transmission path between the internal combustion engine and the continuously variable transmission; and
    the engine clutch is interposed on the power transmission path between the joining point and the internal combustion engine.

4. The drive system according to claim 1, wherein the drive train includes a gear transmission including:
    an input shaft connected to the output shaft of the continuously variable transmission;
    an output shaft; and
    a transmission gear train having a neutral stage.

5. The drive system according to claim 1, further comprising an exhaust pipe connected to the internal combustion engine from one side in a predetermined direction, wherein
    the electric motor is arranged at the other side of the internal combustion engine in the predetermined direction.

6. The drive system according to claim 1, wherein the electric motor overlaps the internal combustion engine when viewed in the front-rear direction of the vehicle.

7. The drive system according to claim 1, wherein at least a part of the electric motor is arranged in a region between one vehicle width direction end of the internal combustion engine and the other vehicle width direction end of the internal combustion engine in a vehicle width direction of the vehicle.

8. The drive system according to claim 6, wherein a driving shaft of the electric motor extends parallel to the crank shaft of the internal combustion engine.

9. The drive system according to claim 1, wherein the electric motor is closer to an intake port of the internal combustion engine than to an exhaust port of the internal combustion engine.

10. The drive system according to claim 1, wherein:
the branch train is arranged at a first side of the internal combustion engine in an axial direction of the crank shaft; and
the MG train is arranged at a second side of the internal combustion engine in the axial direction of the crank shaft.

11. The drive system according to claim 1, wherein:
the branch train includes
a propeller shaft that connects the drive train to a front wheel and
a gear assembly that connects the electric motor to an intermediate portion of the propeller shaft; and
the gear assembly includes a motor clutch that cuts a power transmission path extending from the electric motor to the propeller shaft.

12. The drive system according to claim 1, wherein the engine clutch and the input shaft of the continuously variable transmission are arranged on the same axis as the crank shaft.

13. A drive system of a hybrid utility vehicle, the drive system comprising:
an internal combustion engine including a crank shaft;
a continuously variable transmission including
an input shaft connected to the internal combustion engine,
an output shaft,
a driving pulley disposed at the input shaft,
a driven pulley disposed at the output shaft, and
a belt wound around the driving pulley and the driven pulley;
a drive train that connects the output shaft of the continuously variable transmission to a driving wheel;
an electric motor;
a branch train that connects the electric motor to the drive train such that power is transmitted from the electric motor to the drive train;
an engine clutch that cuts transmission of rotational driving power, which has been input from the electric motor through the branch train to the drive train, to the internal combustion engine, wherein
the branch train includes:
a propeller shaft that connects the drive train to a front wheel; and
a gear assembly that connects the electric motor to an intermediate portion of the propeller shaft.

14. The drive system according to claim 13, wherein the gear assembly includes a motor clutch that cuts a power transmission path extending from the electric motor to the propeller shaft.

* * * * *